(12) United States Patent
Shimizu et al.

(10) Patent No.: US 6,573,966 B1
(45) Date of Patent: Jun. 3, 2003

(54) PARALLEL FIELD DEVICE WITH COMPENSATING DOMAINS HELD BY A BOUNDARY SURFACE AND STABILIZED BY AUXILIARY ELECTRODES

(75) Inventors: Hidehisa Shimizu, Sagamihara (JP); Kaoru Kusafuka, Kawasaki (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/568,800

(22) Filed: May 11, 2000

(30) Foreign Application Priority Data

May 11, 1999 (JP) .......................................... 11-130219

(51) Int. Cl.[7] .......................................... G02F 1/1345
(52) U.S. Cl. .......................................... 349/141
(58) Field of Search .................................. 349/141, 129

(56) References Cited

U.S. PATENT DOCUMENTS

| | | | | |
|---|---|---|---|---|
| 5,598,285 A | * | 1/1997 | Kondo et al. ................. | 349/39 |
| 5,872,611 A | * | 2/1999 | Hirata et al. ................. | 349/147 |
| 5,923,310 A | * | 7/1999 | Kim ............................. | 345/90 |
| 6,088,078 A | * | 7/2000 | Kim et al. .................... | 349/141 |
| 6,184,961 B1 | * | 2/2001 | Ham ............................ | 349/129 |
| 6,259,503 B1 | * | 7/2001 | Watanabe et al. ........... | 349/129 |
| 6,266,116 B1 | * | 7/2001 | Ohta et al. ................... | 349/141 |

* cited by examiner

Primary Examiner—Kenneth Parker
(74) Attorney, Agent, or Firm—Charles W. Peterson, Jr.; David Shofi; Mariaqn Underweiser

(57) ABSTRACT

A liquid crystal display element. The liquid crystal display includes a first substrate 3, a second substrate 4 paired with the first substrate 3, a liquid crystal layer 5 interposed between the first substrate 3 and the second substrate 4, and a switching electrode comprising a first comb-shaped electrode 1 and a second comb-shaped electrode 2. Preferably, a first domain 6 and a second domain 7, which are preferably symmetrically polarized about a center line X between opposing electrodes, are formed between a tooth 1-1 of the first comb-shaped electrode 1 and a tooth 2-1 of the second comb-shaped electrode 2 constituting the opposing electrodes of the switching electrode.

20 Claims, 12 Drawing Sheets

(a)

(b)

VIEWING ANGLE PROPERTIES OF INVENTION(CONTRAST RATIO)

VIEWING ANGLE PROPERTIES OF PRIOR ART(CONTRAST RATIO)

GRADATION NON-INVERSION REGION OF PRIOR ART
(LIGHT BLUE PORTION)

GRADATION NON-INVERSION REGION OF INVENTION
(LIGHT BLUE PORTION)

PARALLEL FIELD DEVICE WITH COMPENSATING DOMAINS HELD BY A BOUNDARY SURFACE AND STABILIZED BY AUXILIARY ELECTRODES

BACKGROUND OF THE INVENTION

1. Field of the Invention

The present invention relates to a liquid crystal display element and a method of manufacturing the same and more particularly to a liquid crystal display element having an In Plane Switching (hereinafter also referred to as IPS) structure.

2. Background Description

A laptop computer, a notebook personal computer, a small-size color television and so on are in rapidly increasing demand because of recent space saving and increase in personal use. A liquid crystal display element having an IPS structure is used for a display for use in these computers or the like in that the display using this element is slim, lightweight and driven by a low voltage and additionally the display has a wide viewing angle and also high contrast.

However, even the liquid crystal display element having the IPS structure is not perfect in the viewing angle and the contrast. For example, a region of a display screen which is inverted from white to black and vice versa. i.e., a gradation inversion region is present depending on the viewing angle. Moreover, the liquid crystal display element having the IPS structure has a problem of a slow response.

A method of reducing a gradation inversion by bending a switching electrode in the liquid crystal display element into "a V shape" is disclosed in Japanese Patent Application Laid-open No. 9-258269 in view of such a problem.

On the other hand, a method of preventing the gradation inversion by utilizing a vertical alignment of a liquid crystal layer is disclosed in "A Vertically Aligned LCD Providing Super-High Image Quality" and "A Novel Viewing Angle Technology for AM-LCDs" in IWD '97.

However, the method described in Japanese Patent Application Laid-open No. 9-258269 cannot solve the problem of the slow response which the IPS has heretofore had. Moreover, the latter method described in IWD '97 needs an optical film and may further require an advanced process technology. As a result, this method has a considerable disadvantage in yield and cost.

OBJECTS OF THE INVENTION

It is an object of the present invention to provide a liquid crystal display element having a novel structure which has a wide viewing angle and high contrast and is more quickly responsive, and a method of manufacturing the same.

SUMMARY OF THE INVENTION

A liquid crystal display element of the present invention comprises a first substrate; a second substrate paired with the first substrate; and a liquid crystal layer interposed between the first substrate and the second substrate. The liquid crystal layer has two domains for compensating for a gradation inversion of the liquid crystal display element when the liquid crystal display element is driven.

Moreover, preferably, the liquid crystal display element of the present invention further comprises a switching electrode having at least one pair of opposing electrodes. The liquid crystal layer has the two domains for compensating for the gradation inversion between the opposing electrodes of the switching electrode.

Furthermore, preferably, the two domains for compensating for the gradation inversion of the liquid crystal display element of the present invention are symmetrically oriented about a center line between the opposing electrodes of the switching electrode.

BRIEF DESCRIPTION OF THE FIGURES

The foregoing and other objects, aspects, and advantages will be better understood from the following non limiting detailed description of preferred embodiments of the invention with reference to the drawings that include the following.

DESCRIPTION OF A PREFERRED EMBODIMENT OF THE INVENTION

Figure 1:
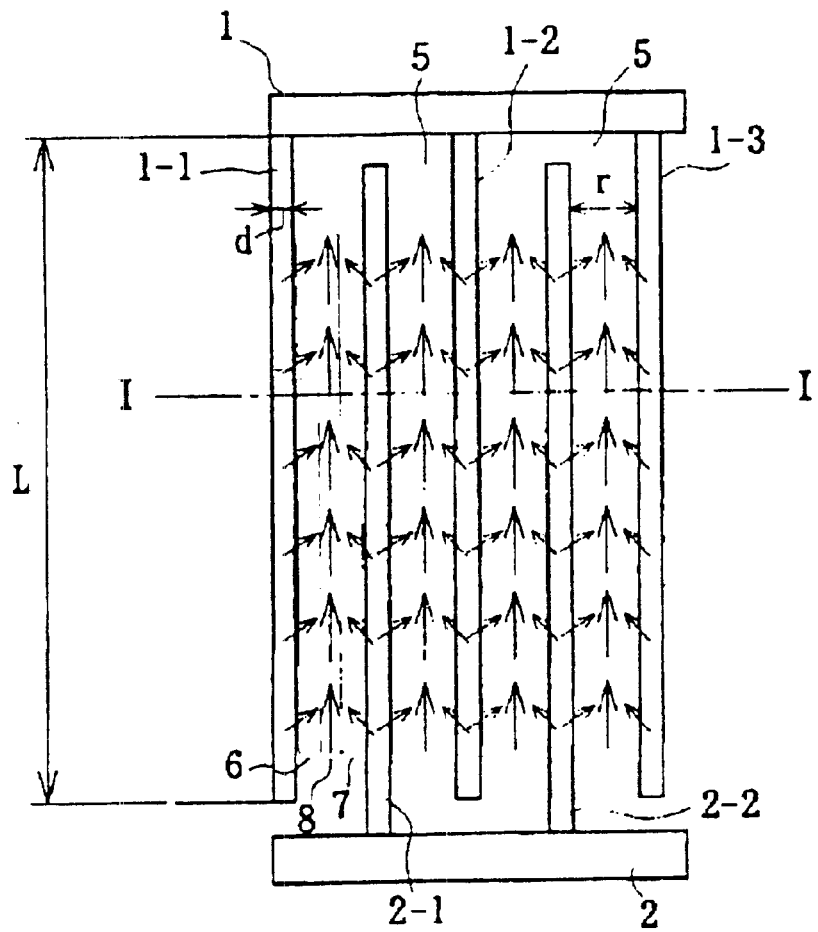
FIG. 1 is a schematic illustration of one example of a liquid crystal display element of the present invention.
Figure 1:
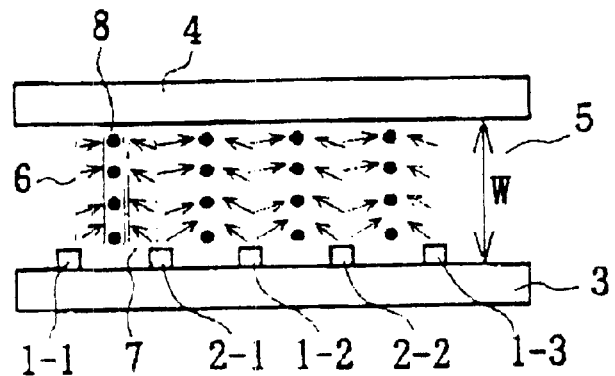

Turning now to the drawings and more particularly FIG. 1 is a schematic illustration of one preferable example of the liquid crystal display element of the present invention. FIG. 1(a) is a top plan view of the liquid crystal display element of the present invention. FIG. 1(b) is a cross sectional view taken along line I—I of FIG. 1(a), showing a cross section of the liquid crystal display element shown in FIG. 1(a). Both of FIGS. 1(a) and 1(b) show the liquid crystal display element which is driven by applying a voltage to the liquid crystal display element. Furthermore, the substrate is not shown in FIG. 1(a) in order to clearly describe features of the liquid crystal display element of the present invention.

The liquid crystal display element shown in FIG. 1 comprises a first substrate 3, a second substrate 4 and a liquid crystal layer 5 interposed between the first substrate 3 and the second substrate 4. A first comb-shaped switching electrode 1 and a second comb-shaped switching electrode 2, which constitute a pair of switching electrodes, are formed on the first substrate 3. Teeth 1-1 to 1-3 of the electrode 1 run substantially parallel to teeth 2-1 and 2-2 of the electrode 2, and these teeth constitute the opposing electrodes of the switching electrode.

A first domain 6 and a second domain 7, which are symmetrically oriented at boundary surface 8 about a center line between the opposing electrodes, are formed between the opposing electrodes comprising the tooth 1-1 of the first comb-shaped switching electrode 1, the tooth 2-1 of the second comb-shaped switching electrode 2 and so on.

Figure 12:
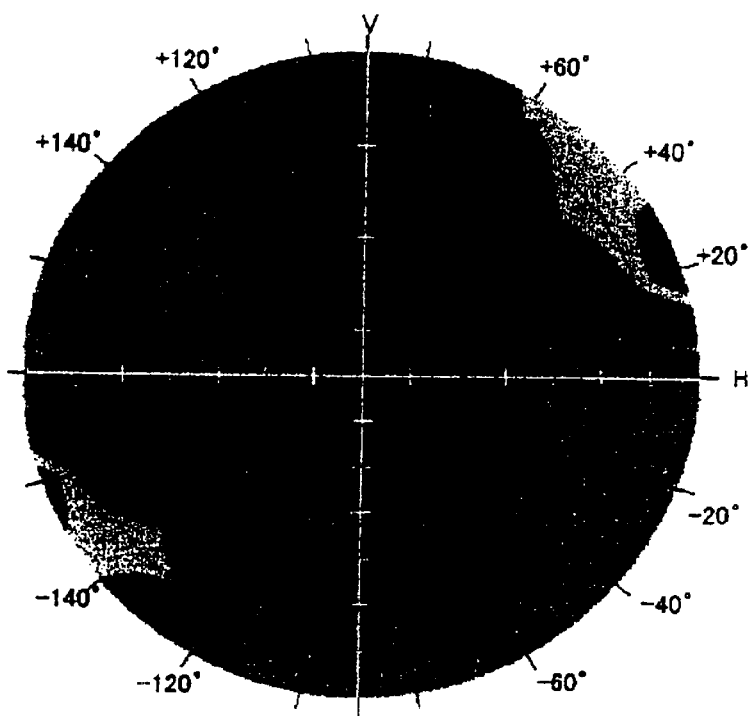
FIG. 12 is a map showing the dependence of a gradation inversion region on the viewing angle in the liquid crystal display element of the prior art.
Figure 13:
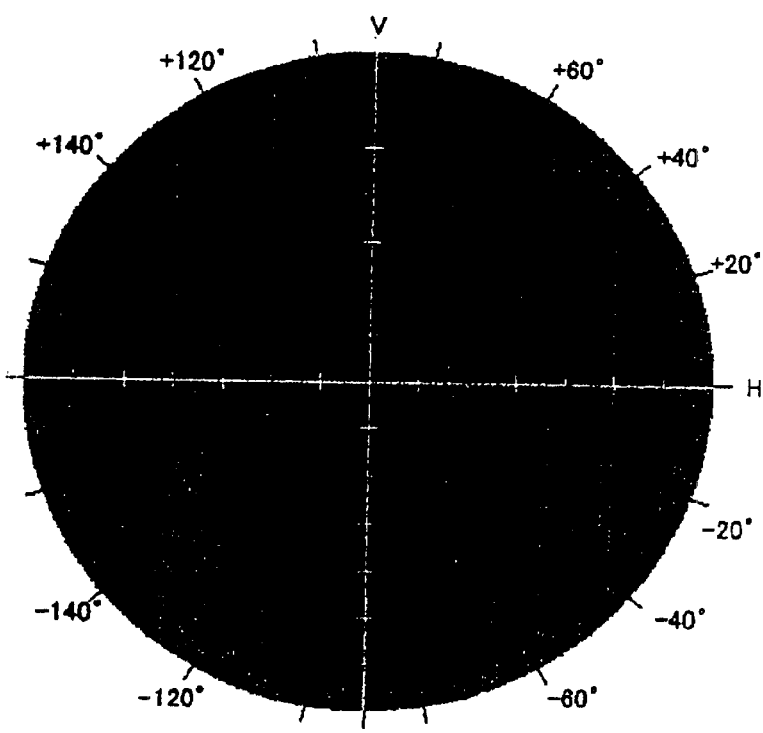
FIG. 13 is a map showing the dependence of the gradation inversion region on the viewing angle in the liquid crystal display element of the present invention.

FIG. 12 shows measured data as to the prior art. The measured data is obtained by mapping a result of measurement of a gradation non-inversion region relative to a viewing angle. In this case, the gradation non-inversion region belongs to the liquid crystal display element having an IPS structure including the liquid crystal layer having only one domain. Level 0 indicates the gradation non-inversion region, namely, that no gradation inversion is observed. As the level value becomes higher, the more gradation inversion is observed. FIG. 13 shows the data obtained by mapping the result of measurement of the gradation non-inversion region relative to the viewing angle. In this case, the gradation non-inversion region belongs to the liquid crystal display element having the IPS structure of the present invention.

A center point O FIGS. 12 and 13 indicates a state of the gradation inversion which is observed when one point on a liquid crystal display screen is seen from immediately above. A horizontal axis H indicates the state of the gradation inversion which is observed when an observing point is inclined in a horizontal direction of the liquid crystal display screen from immediately above one point on the liquid crystal display screen. A vertical axis V indicates the state of the gradation inversion which is observed when the observing point is inclined in a vertical direction of the liquid crystal display screen from immediately above one point on the liquid crystal display screen. Therefore, the horizontal axis H and the vertical axis V indicate an angle of direction relative to one point on the liquid crystal display screen, namely, the viewing angle. As is apparent from FIGS. 12 and 13, it is seen that the liquid crystal display element of the present invention has no gradation inversion.

A cause of this can be considered as the following fact. In the liquid crystal layer having only one domain of the prior art, the gradation inversion occurs in a particular direction. FIG. 12 shows the state of the case where liquid crystal molecules are rotated clockwise. It is seen from FIG. 12 that the gradation inversion occurs at the upper right and lower left viewing angles. However, when the liquid crystal molecules are rotated counterclockwise, even one domain has a gradation inversion region at the upper left and lower right viewing angles and no gradation inversion at the upper right and lower left viewing angles. Therefore, the liquid crystal layer having two domains should often have the gradation inversion in either one domain or the other domain in perspective view. However, this liquid crystal layer has no gradation inversion as shown in FIG. 13.

Figure 14:
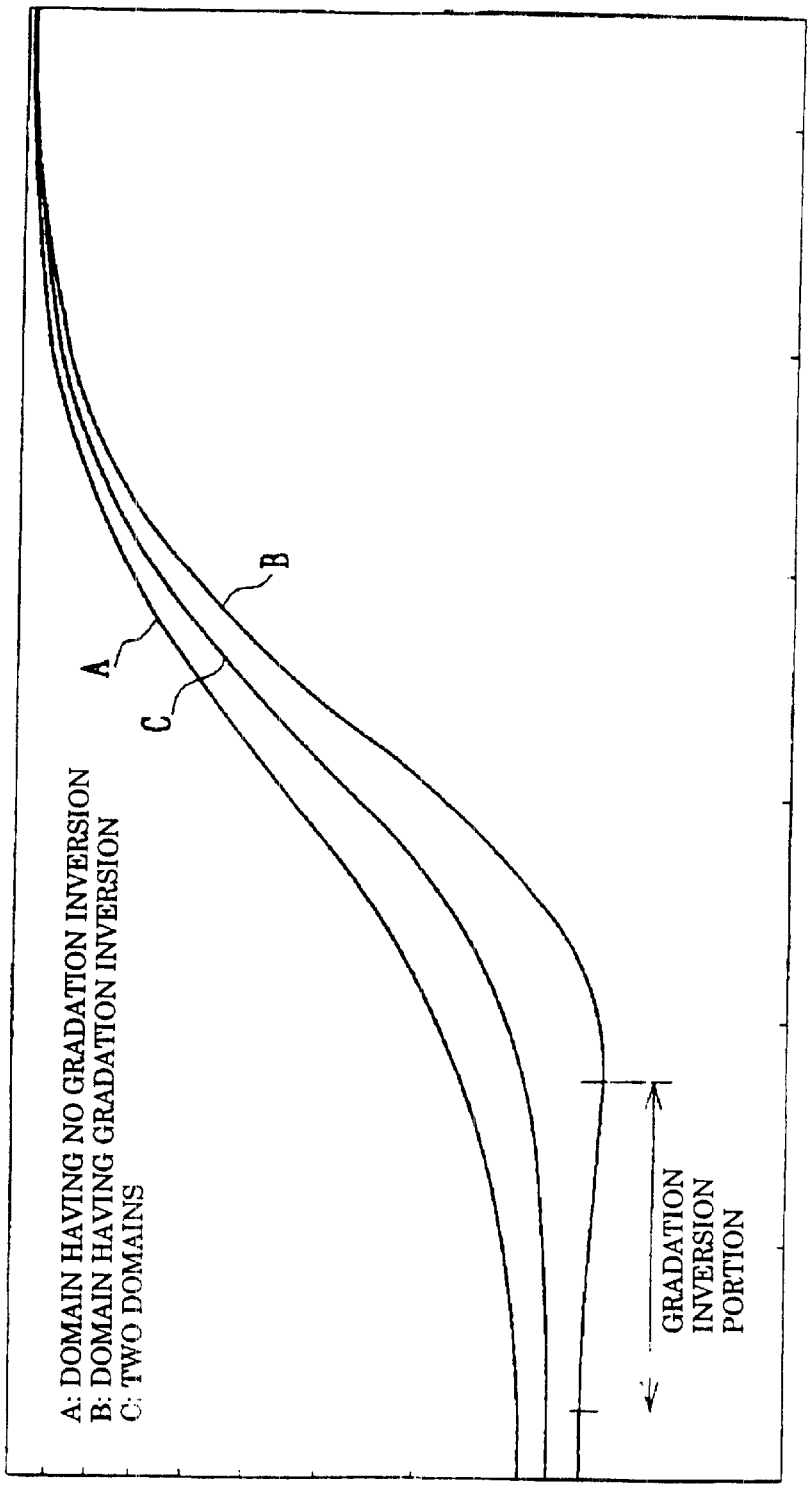
FIG. 14 is a graph of a relationship between an applied voltage and luminance in the liquid crystal display element.

The reason why the liquid crystal layer having two domains has no gradation inversion will be further described with reference to FIG. 14. FIG. 14 shows a relationship between an applied voltage and luminance of a domain A having no gradation inversion, a domain B having the gradation inversion and two domains C, i.e., one domain having no gradation inversion and the other domain having the gradation inversion. It is seen that the domain B having the gradation inversion has a portion having the luminance decreasing with an increase in the applied voltage in a low-voltage region, namely, a gradation inversion portion. As shown in FIG. 14, an inclination of the relationship between the voltage and the luminance of the gradation inversion portion of the domain B having the gradation inversion in the direction of a certain viewing angle is always gentler than the inclination of the domain A having no gradation inversion. Thus, the two domains C are affected by the inclination of the domain A having no gradation inversion, and therefore no gradation inversion occurs.

As described above, a liquid crystal display element of the present invention needs to have a liquid crystal layer 5 having two domains for compensating for a gradation inversion of the liquid crystal display element. Preferably, as shown in FIG. 1, the liquid crystal layer 5 has the two domains for compensating for the gradation inversion between opposing electrodes of a comb-shaped switching electrode comprising a tooth 1-1 of a first comb-shaped switching electrode 1, a tooth 2-1 of a second comb-shaped switching electrode 2 and so on. This enhances an effect of compensation for the gradation inversion.

Furthermore, preferably, the two domains are symmetrically oriented at boundary surface 8 about a center line between the opposing electrodes. This further improves the effect of compensation for the graduation inversion.

Moreover, the liquid crystal display element of the present invention needs to have a constitution shown in FIG. 1 when the liquid crystal display element is driven. The constitution of the liquid crystal display element which is not driven is not limited in particular. However, preferably, as shown in FIG. 4, when the liquid crystal display element is not driven, the liquid crystal molecules are oriented substantially parallel to a longitudinal direction of the switching electrode, and the liquid crystal molecules are oriented so as to be inclined with respect to a first substrate on which the switching electrode is formed.

Figure 4:
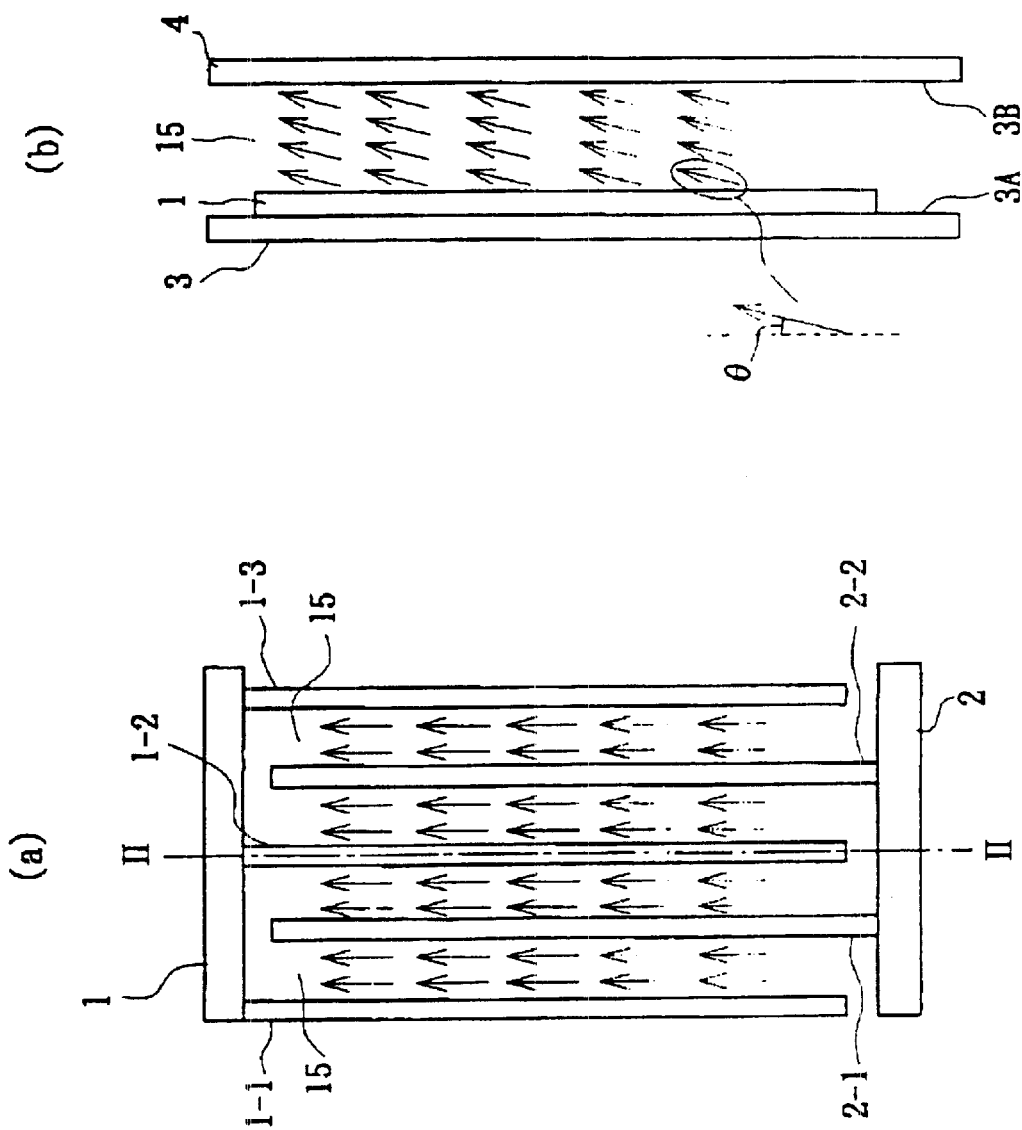
FIG. 4 is a schematic illustration of another example of the liquid crystal display element of the present invention.

FIG. 4 is a schematic illustration of one example of the constitution of the liquid crystal display element of the present invention which is not driven. FIG. 4(a) is a top plan view of the liquid crystal display element which is not driven. FIG. 4(b) is a cross sectional view taken along line II—II of FIG. 4(a), showing a cross section of the liquid crystal display element shown in FIG. 4(a). Similarly to FIG. 1(a), the substrate is not shown in FIG. 4(a). The same elements as the elements of the liquid crystal display element of FIG. 1 are indicated by the same reference numerals.

A liquid crystal layer 15 of the liquid crystal display element shown in FIG. 4 is oriented substantially parallel to the teeth 1-1 to 1-3 of the first comb-shaped electrode 1 and the teeth 2-1 and 2-2 of the second comb-shaped electrode 2. That is, the liquid crystal layer 15 is oriented in the longitudinal direction of the switching electrode comprising the first comb-shaped electrode 1 and the second comb-shaped electrode 2. Furthermore, the liquid crystal layer 15 is inclined at a predetermined angle q (hereinafter also referred to as a pre-tilt angle) with respect to a first substrate 3.

In the liquid crystal display element having the constitution shown in FIG. 4, the liquid crystal display element having two domains 6 and 7 shown in FIG. 1 can be obtained only by applying a predetermined voltage to the liquid crystal layer 15.

A magnitude of the pre-tilt angle q is not particularly limited. However, preferably, the pre-tilt angle q should be 1° to 30° in order to form the two domains 6 and 7 having a clear boundary surface 8 therebetween. More preferably, the pre-tilt angle q should be 3° to 15°. Furthermore, the direction of orientation of liquid crystal is substantially parallel to the longitudinal direction of the electrode. The phrase "substantially parallel" herein means that the angle between the direction of orientation of the liquid crystal and the longitudinal direction of the electrode is smaller than the pre-tilt angle q of the electrode.

Moreover, preferably, the voltage to be applied to the liquid crystal layer 15 should be 3 V to 20 V. More preferably, the voltage should be 5 V to 15 V.

A method of manufacturing the liquid crystal display element having the constitution shown in FIG. 4 is not limited in particular. However, the liquid crystal display element having the constitution shown in FIG. 4 can be easily formed by the following manufacturing method.

First, each orientation film (not shown) is formed on a main surface 3A of the first substrate 3 and a main surface 4A of a second substrate 4, the first substrate 3 having the first and second comb-shaped electrodes 1 and 2 constituting the switching electrode, the main surfaces 3A and 4A facing each other. Then, the facing main surfaces of the orientation films are rubbed along the teeth 1-1 to 1-3 of the first comb-shaped electrode 1 and the teeth 2-1 and 2-2 of the second comb-shaped electrode 2. Then, the liquid crystal layer is interposed between the first and second substrates 3 and 4, each having the orientation film thus rubbed. Thus, the liquid crystal display element comprising the liquid crystal layer 15 oriented as shown in FIG. 4 can be obtained.

In a conventional IPS method, the orientation film is rubbed obliquely with respect to the electrode. However, since the electrode has a predetermined thickness, a rubbing roll does not sufficiently come in contact with the orientation film of the region closer to the electrode. Consequently, a rubbing failure is prone to occur near the electrode. However, in the present invention, as described above, the orientation films are rubbed along the teeth 1-1 to 1-3 of the first comb-shaped electrode 1 and the teeth 2-1 and 2-2 of the second comb-shaped electrode 2. Thus, little rubbing failure occurs near the electrode. Therefore, light leakage near the electrode can be prevented and thus a perfect black state can be realized.

Figure 2:
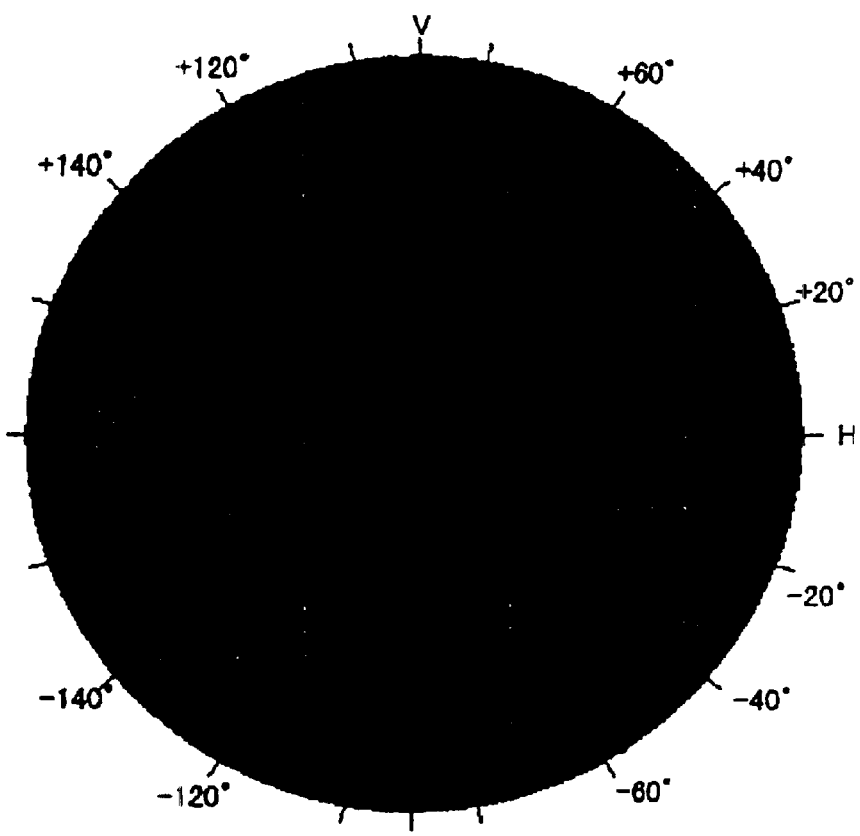
FIG. 2 is a map showing dependence of contrast on a viewing angle in the liquid crystal display element of the present invention.
Figure 3:
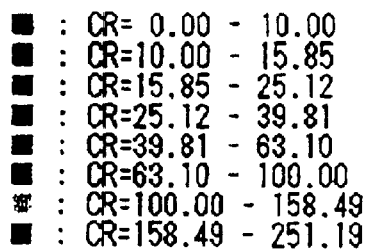
FIG. 3 is a map showing the dependence of the contrast on the viewing angle in the liquid crystal display element of the prior art.
Figure 3:
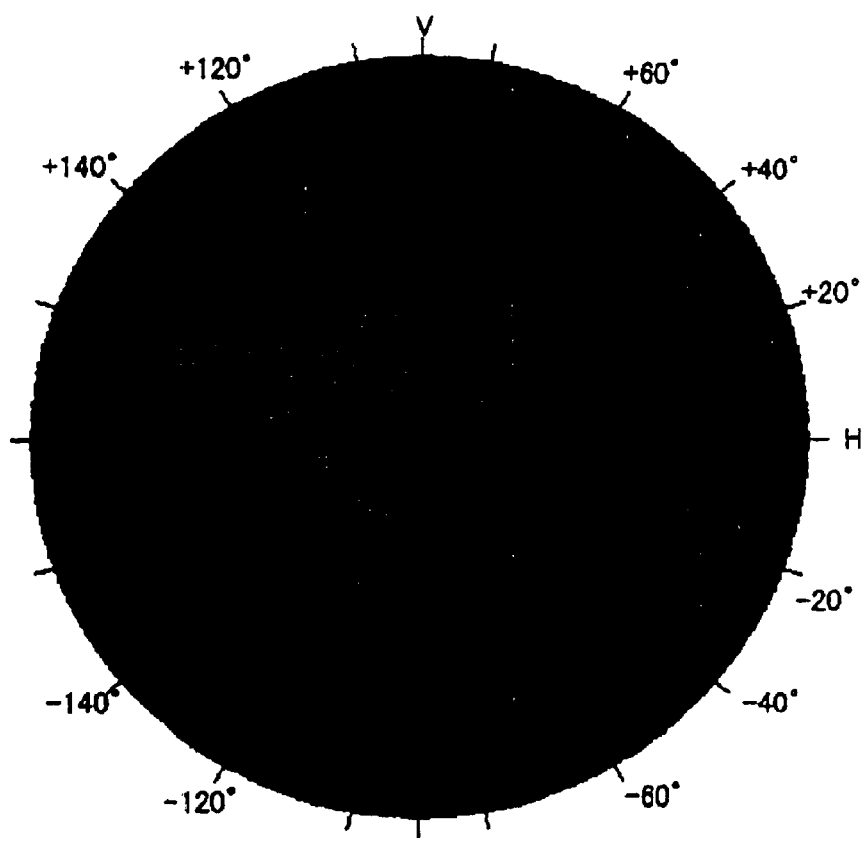

FIG. 2 shows viewing angle properties relative to contrast in the present invention. FIG. 3 shows the viewing angle properties relative to the contrast in the prior art. It is seen that the present invention achieves the great improvement in the contrast.

The orientation film can be made of a high polymeric material such as polyimide.

The magnitude of the pre-tilt angle q depends on rubbing conditions as well as the material and the thickness of the orientation film to be used, or the like. Accordingly, these conditions are appropriately selected and implemented in order to form the pre-tilt angle q within the above-described range.

Since the liquid crystal display element of the present invention has the two domains in the liquid crystal layer, interfacial energy is generated on an interface between the two domains. In particular, the relatively high interfacial energy is generated between the first and second domains 6 and 7 which are symmetrically polarized about the center line at the boundary surface 8 between the opposing electrodes of the switching electrode comprising the comb-shaped electrodes, like the liquid crystal display element shown in FIG. 1.

On the other hand, the liquid crystal display element shown in FIG. 1 is formed by applying the above-described voltage to the liquid crystal layer 15 of the liquid crystal display element shown in FIG. 4. Therefore, when the application of the voltage to the liquid crystal layer 5 of the liquid crystal display element shown in FIG. 1 is stopped, the first and second domains 6 and 7 attempt to enter a stable state by orienting themselves in the same direction of polarization in order to eliminate the interfacial energy. That is, the liquid crystal layer of the liquid crystal display element is restored from the orientation of the liquid crystal layer 5 shown in FIG. 1 to the orientation of the liquid crystal layer 15 shown in FIG. 4 by utilizing the interfacial energy as well as a force for reducing a skew.

Thus, the liquid crystal display element of the present invention can be switched at high speed by using the interfacial energy generated between the two domains formed in the liquid crystal layer. Quick responsivity as well as the wide viewing angle and the high contrast can be therefore achieved.

This high-speed switching using the interfacial energy can be also executed by a multidomain using V-shaped electrodes. However, the switching speed can be further increased because the present invention can greatly increase a length of the boundary between the domains.

The liquid crystal display element shown in FIGS. 1 and 4 may be deficient in electric field strength because the electric field strength may be perturbed at the ends of the comb-shaped switching electrode comprising the first and second comb-shaped electrodes 1 and 2, i.e., at the bases of the teeth 1-1 to 1-3 and 2-1 and 2-2. As a result, the boundary surfaces 8 in such a portion may be very unstable in energy.

When the liquid crystal display element is kept driven in such a state, the boundary surface 8 becomes unstable in the whole liquid crystal layer 5. As a consequence, an afterimage may be generated on a liquid crystal display screen or the compensation for the gradation inversion may be insufficient. Thus, an object of the present invention may be unable to be fully achieved.

Preferably, auxiliary electrodes are therefore provided at the ends of the comb-shaped electrodes constituting the switching electrode of the liquid crystal display element shown in FIGS. 1 and 4.

Figure 5:
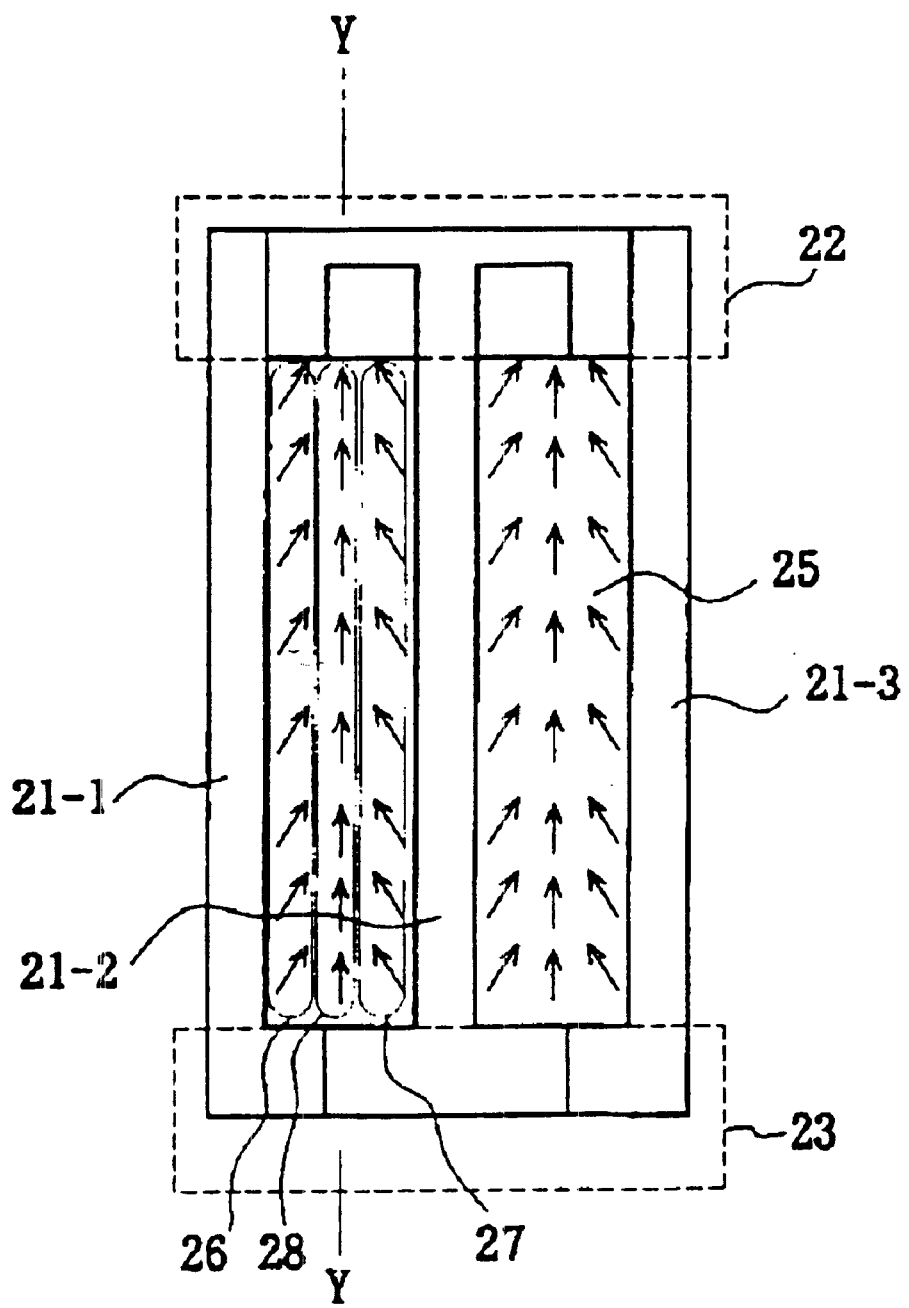
FIG. 5 is a top plan view of one example of the liquid crystal display element of the present invention having auxiliary electrodes.

FIG. 5 is a top plan view of one example of the case where the auxiliary electrodes are provided at the ends of the switching electrode of the liquid crystal display element. In FIG. 5, the constitution of the switching electrode is shown in the form of a simple constitution instead of the constitution shown in FIGS. 1 and 4 in order to clearly describe the constitution of the auxiliary electrode, or the like.

In the liquid crystal display element shown in FIG. 5, a first auxiliary electrode 22 and a second auxiliary electrode 23 are located at the ends of switching electrodes 21-1 to 21-3. A liquid crystal layer 25 is situated between the switching electrodes 21-1 and 21-2 and between the switching electrodes 21-2 and 21-3. A first domain 26 and a second domain 27, which are symmetrically polarized about a center line Y between the opposing switching electrodes, are formed in the liquid crystal layer 25.

The constitution of the first and second auxiliary electrodes 22 and 23 is not particularly limited as far as the constitution can achieve the above object.

Figure 6:
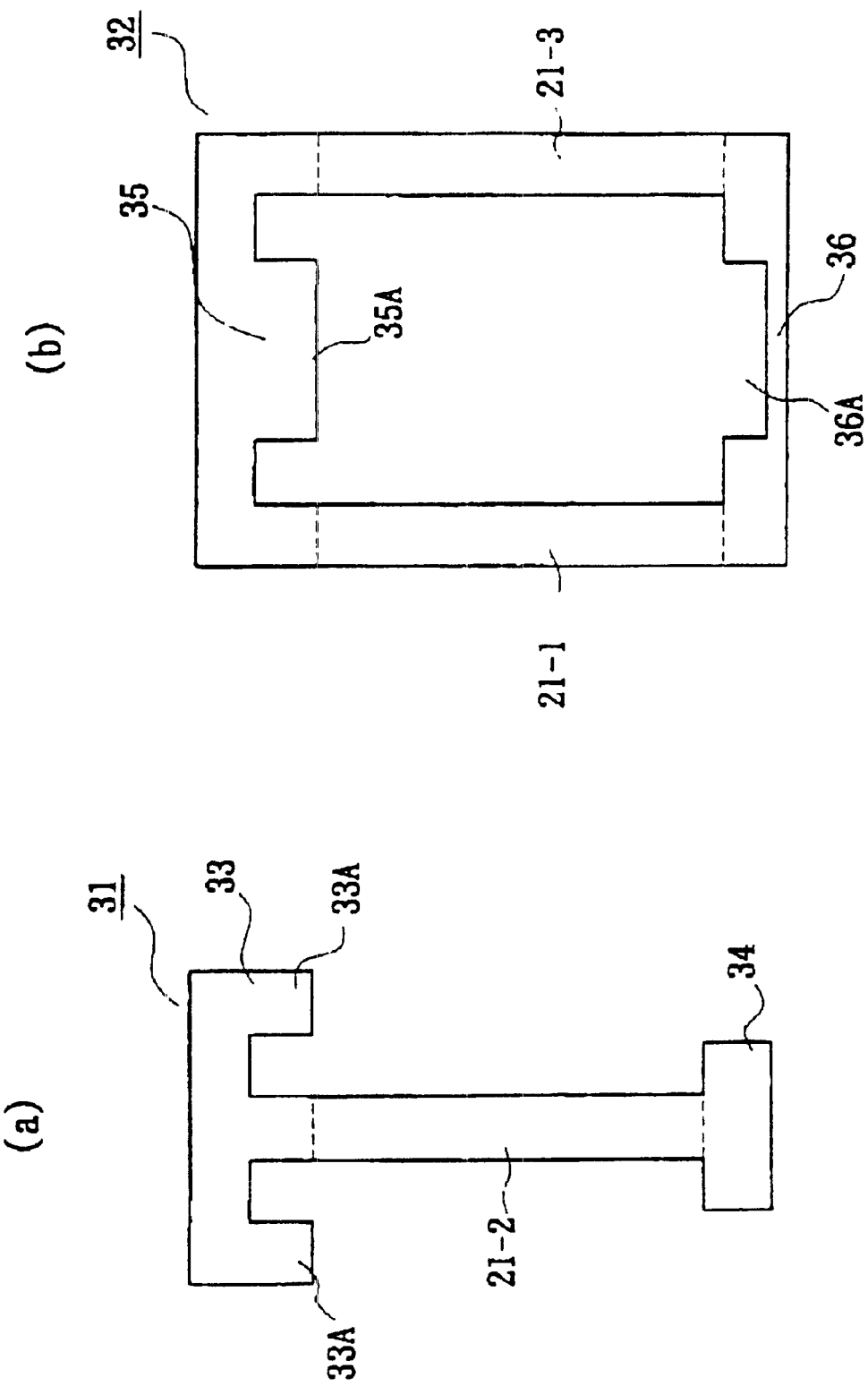
FIG. 6 is a plan view of a preferred mode of the auxiliary electrode shown in FIG. 5.
Figure 7:
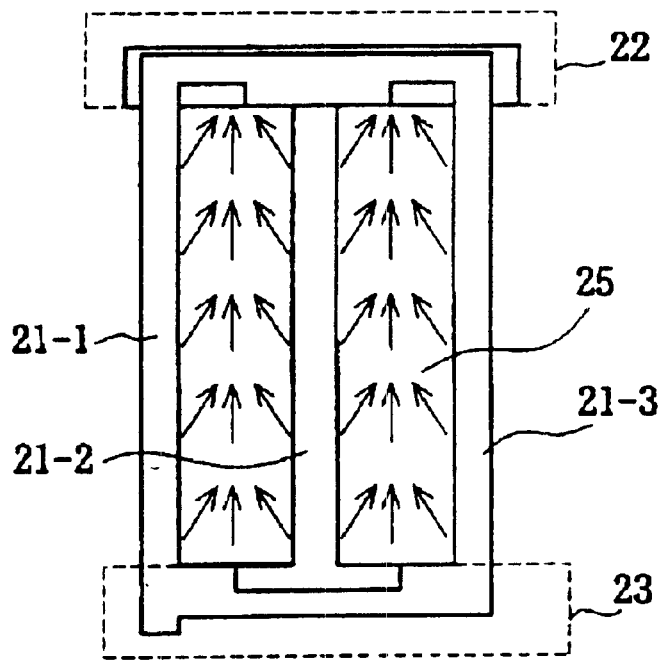
FIG. 7 is a top plan view of a modification of the liquid crystal display element shown in FIG. 5.
Figure 8:
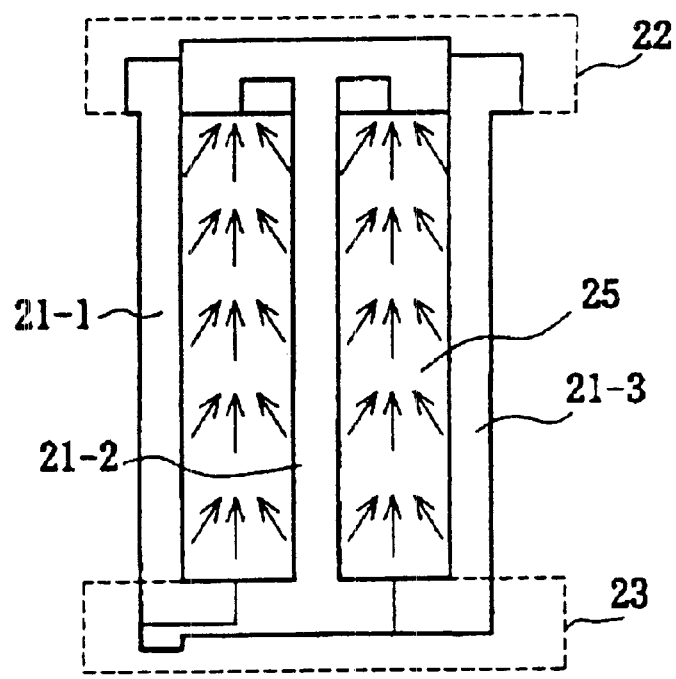
FIG. 8 is a top plan view of another modification of the liquid crystal display element shown in FIG. 5.
Figure 9:
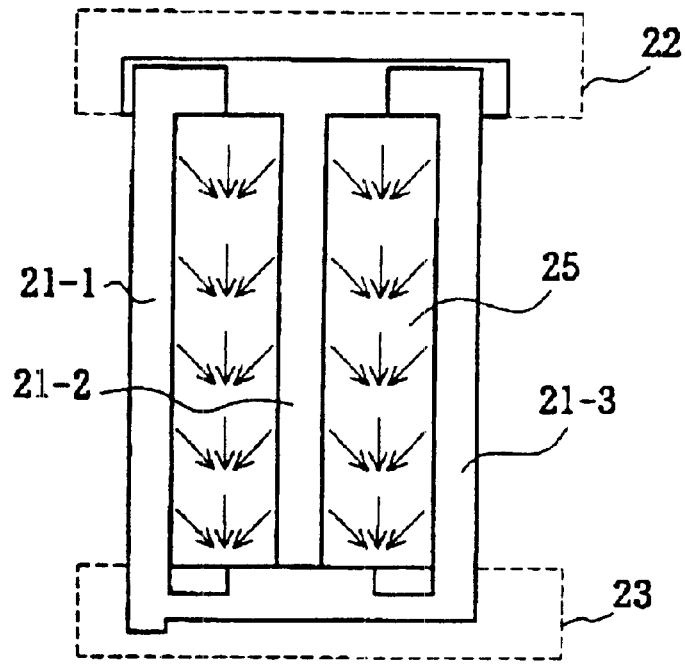
FIG. 9 is a top plan view of still another modification of the liquid crystal display element shown in FIG. 5.
Figure 10:
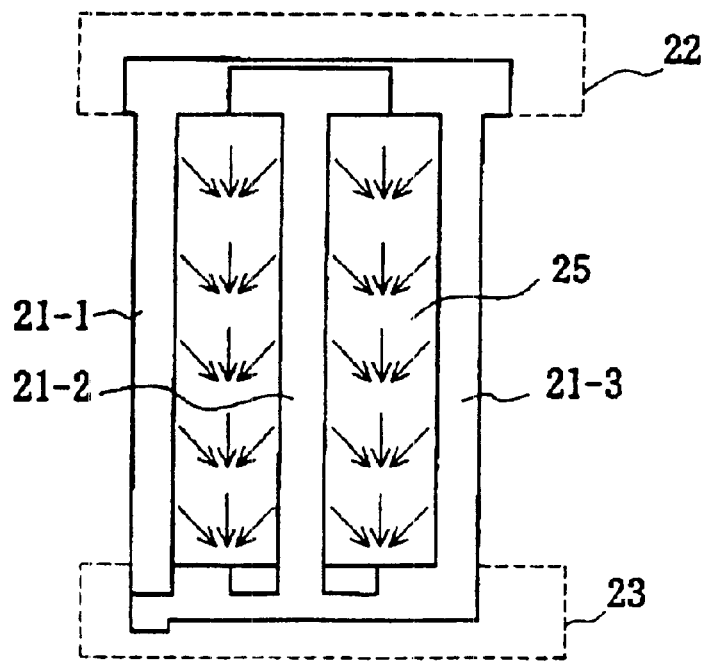
FIG. 10 is a top plan view of a further modification of the liquid crystal display element shown in FIG. 5.

FIG. 6 shows a preferred mode of the auxiliary electrode.

The auxiliary electrode shown in FIG. 6 comprises an upper auxiliary electrode 31 shown in FIG. 6(a) and a lower auxiliary electrode 32 shown in FIG. 6(b). The upper auxiliary electrode 31 comprises a T-shaped auxiliary electrode 33 having convex portions 33A at both the ends thereof, and a rod-like auxiliary electrode 34. The lower auxiliary electrode 32 comprises a U-shaped auxiliary electrode 35 having a convex portion 35A at the center thereof, and a concave auxiliary electrode 36 having a concave portion 36A at the center thereof. To practically use these auxiliary electrodes, the upper auxiliary electrode 31 and the lower auxiliary electrode 32 are laminated through an insulating film.

Therefore, when the auxiliary electrode shown in FIG. 6 is used, the first auxiliary electrode 22 shown in FIG. 5 has a laminated structure in which the T-shaped auxiliary electrode 33 and the U-shaped auxiliary electrode 35 are laminated so that the convex portions 33A and 35A may alternately protrude. The second auxiliary electrode 23 shown in FIG. 5 has the laminated structure in which the rod-like auxiliary electrode 34 and the concave auxiliary electrode 36 are laminated.

The first and second auxiliary electrodes 22 and 23 are constituted as described above, whereby the electric field strength at the ends of the switching electrodes 21-1 to 21-3 becomes more uniform. Therefore, a boundary surface 28 between the first and second domains 26 and 27 becomes very stable in energy. Thus, a problem such as the afterimage on the liquid crystal display screen can be avoided.

Moreover, in FIG. 6, the switching electrode 21-2 is continuously formed with the T-shaped auxiliary electrode 33 constituting the first auxiliary electrode 22 and the rod-like auxiliary electrode 34 constituting the second auxiliary electrode 23. Moreover, the switching electrodes 21-1 and 21-3 are continuously formed with the U-shaped auxiliary electrode 35 constituting the first auxiliary electrode 22 and the concave auxiliary electrode 36 constituting the second auxiliary electrode 23.

The auxiliary electrodes and the switching electrodes are thus continuously formed so that a uniform electrode is constituted, whereby a process of making the auxiliary electrodes and the switching electrodes is simplified.

FIGS. 7 to 10 show modifications of the auxiliary electrode of the present invention.

If the constitution shown in FIG. 5 is replaced with the constitution shown in FIGS. 7 to 10, the effect of the liquid crystal display element of the present invention can be fully achieved.

Figure 11:
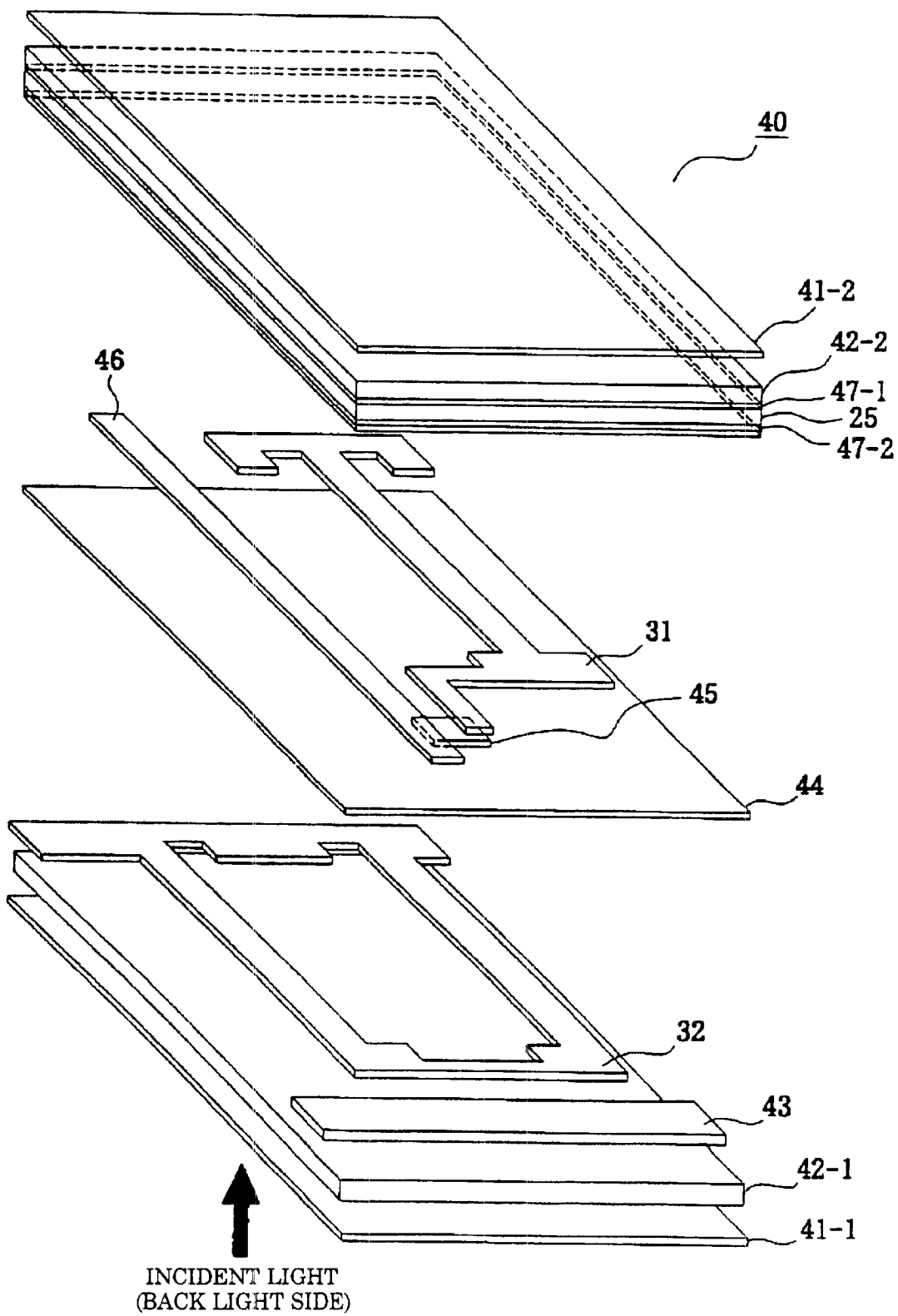
FIG. 11 is a perspective view of the whole liquid crystal display element of the present invention having the auxiliary electrodes.

FIG. 11 is a perspective view of one example of the whole constitution of the liquid crystal display element of the present invention having the auxiliary electrodes.

In a liquid crystal display element 40 shown in FIG. 11, a gate line 43 and the lower auxiliary electrode 32 are formed on a glass substrate 42-1, and an insulating film 44 is formed on the gate line 43 and the lower auxiliary electrode 32. A data bus line 46 is formed on the insulating film 44, and the upper auxiliary electrode 31 is formed on the insulating film 44 through amorphous silicon 45. On the other hand, orientation films 47-1 and 47-2 are formed on a glass substrate 42-2, and the liquid crystal layer 25 is interposed between the orientation films 47-1 and 47-2. The glass substrates 42-1 and 42-2 are laminated, thereby constituting the liquid crystal display element 40.

Polarizing plates 41-1 and 41-2 are located on the outsides of the glass substrates 42-1 and 42-2, respectively.

A method of driving the liquid crystal display element of the present invention is not particularly limited. Any method of an active matrix method, a method using an STN mode, a direct drive method and a beam address method can be used. However, preferably, a nonlinear active element such as a TFT (Thin Film Transistor) element is provided on the first substrate 3 shown in FIGS. 1 and 4, whereby the active matrix method is used. Thus, the high-image-quality, high-integration and large-capacity liquid crystal display element can be obtained.

Moreover, a color filter can be provided closer to the second substrate 4 shown in FIGS. 1 and 4. Thus, the liquid crystal display element capable of color display can be obtained.

Next, a specific example of the liquid crystal display element of the present invention will be given.

EXAMPLE

In this example, the liquid crystal display element shown in FIGS. 1 and 4 was prepared.

The comb-shaped switching electrodes 1 and 2, each having an electrode width d of 5 mm, a distance r between the opposing electrodes of 10 mm and a length L of 1 cm. were used as the switching electrode. The distance between the first and second substrates 3 and 4 was set to 5 mm. A P-type liquid crystal material having refractive index anisotropy of $\Delta n \approx 0.07$ was used for the IPS as the liquid crystal layers 5 and 15.

The pre-tilt angle q of the liquid crystal layer 15 was set in the following manner. That is, polyimide of about 0.1 mm thick was used as the orientation film and this orientation film was rubbed at an angle of 90°, whereby the pre-tilt angle q was set to 5°. Furthermore, the liquid crystal molecules were oriented substantially parallel to the longitudinal direction of the comb-shaped switching electrode by this rubbing.

The voltage was applied to such a liquid crystal display element, and the state of the orientation of the liquid crystal layer was examined by an optical microscope. As a result, two domains were observed in the liquid crystal layer.

At this time, the contrast relative to the whole viewing angle was also examined. As a result, a contrast map shown in FIG. 2 was obtained, and it turned out that a ratio of maximum contrast to minimum contrast was 350:1. Furthermore, the applied voltage was eliminated, and a response time of the liquid crystal display element was examined. As a result, the response time was 43 msec.

COMPARISON

In this comparison, the liquid crystal display element having the same constitution as the constitution of the example was used. However, the orientation film was rubbed in the following manner. That is, the teeth 1-1 to 1-3 of the first comb-shaped electrode 1 shown in FIG. 1 and so on were rubbed at 75°, whereby the liquid crystal molecules were oriented at 75° with respect to the tooth 1-1 and so on and thus the liquid crystal layer was not oriented substantially parallel to the longitudinal direction of the comb-shaped switching electrode. The pre-tilt angle q of the liquid crystal layer was set to 5°.

The voltage was applied to such a liquid crystal display element, and the state of the polarization was examined in the same manner as the example. As a result, it was seen that only one domain was formed. It also turned out that the light leakage occurred at the ends of the electrode.

Furthermore, at this time, the contrast relative to the whole viewing angle was examined. As a result, the contrast map shown in FIG. 3 was obtained, and it turned out that the ratio of maximum contrast to minimum contrast was 200:1. Additionally, the applied voltage was eliminated, and the response time of the liquid crystal display element was examined. As a result, the response time was 50 msec.

As is apparent from the example and the comparison, it is seen that the liquid crystal display element of the present invention has high contrast over the viewing angle and a high response speed.

ADVANTAGES OF THE INVENTION

As described above, the liquid crystal display element of the present invention comprises the liquid crystal layer having two domains for compensating for the gradation inversion. Thus, the high contrast can be obtained over the wide viewing angle.

Moreover, the liquid crystal layer is switched by using the interfacial energy generated between the two domains. Thus, the switching can be executed at very high response speed.

The present invention has been described in detail above in accordance with the preferred embodiments of the invention by giving the specific examples, modifications and variations will occur to those skilled in the art without departing from the spirit or scope of the invention. It is intended that the present invention is not limited to the above-described contents and that such modifications and variations of the invention be within the scope of the appended claims.

REFERENCE NUMERALS 1 first comb-shaped electrode,
1-1, 1-2, 1-3 tooth of first comb-shaped electrode,
2 second comb-shaped electrode,
2-1, 2-2 tooth of second comb-shaped electrode,
3 first substrate,
3A main surface of first substrate facing second substrate,
4 second substrate,
4A main surface of second substrate facing first substrate,
5, 15, 25 liquid crystal layer,
6, 26 first domain,
7, 27 second domain,
8, 28 boundary surface between first and second domains,
21-1, 21-2, 21-3 switching electrode,
22 first auxiliary electrode,
23 second auxiliary electrode,
31 upper auxiliary electrode,
32 lower auxiliary electrode,
33 T-shaped auxiliary electrode,
33A convex portion of T-shaped auxiliary electrode,
34 rod-like auxiliary-electrode,
35 U-shaped auxiliary electrode,
35A convex portion of U-shaped auxiliary electrode,
36 concave auxiliary electrode,
40 liquid crystal display element,
41-1, 41-2 polarizing plate,
42-1, 42-2 glass substrate,
43 gate line,
44 insulating film,
45 amorphous silicon,
46 data bus line,
47-1, 47-2 orientation film,
X center line between opposing electrodes of comb-shaped electrodes,
O center point of contrast map,
q pre-tilt angle,
Y center line between switching electrodes.

We claim:

1. A liquid crystal display element comprising:
a first substrate;
a second substrate paired with said first substrate;
a liquid crystal layer containing liquid crystal molecules interposed between said first substrate and said second substrate; and
a switching electrode having at least one pair of opposing electrodes formed on a main surface of said first substrate, said main surface facing said second substrate,
wherein said liquid crystal molecules are oriented substantially parallel to a longitudinal direction of said switching electrode, and said liquid crystal molecules are oriented so as to be inclined with respect to said main surface of said first substrate,
wherein said liquid crystal layer has two domains for compensating for the gradation inversion between said opposing electrodes of said switching electrode when said liquid crystal display element is driven, and
wherein auxiliary electrodes for forming with stability a boundary surface at both the ends of said switching electrode are provided at both the ends of said switching electrode, said boundary surface being situated between said two domains for compensating for the gradation, inversion.

2. The liquid crystal display element according to claim 1, wherein an angle of inclination of said liquid crystal layer relative to said first substrate is 1° to 30°.

3. The liquid crystal display element according to claim 1, wherein said switching electrode comprises a plurality of comb-shaped switching electrodes, and teeth of said comb-shaped electrodes run substantially parallel to one another, thereby constituting said opposing electrodes of said switching electrode.

4. The liquid crystal display element according to claim 1, wherein said two domains for compensating for the gradation inversion are symmetrically oriented about the center line between said opposing electrodes of said switching electrode.

5. The liquid crystal display element according to claim 4, wherein said comb-shaped switching electrodes and said auxiliary electrodes are continuously formed, thereby constituting a uniform electrode.

6. The liquid crystal display element according to claim 4, wherein said auxiliary electrode comprises a plurality of electrodes laminated through an insulating film.

7. The liquid crystal display element according to claim 6, wherein said auxiliary electrode located at one end of said switching electrode has a laminated structure of a plurality of concave and convex auxiliary electrodes, each having at least one concave portion, and convex portions of said plurality of concave and convex auxiliary electrodes alternately protrude in the direction of lamination.

8. The liquid crystal display element according to claim 7, wherein said auxiliary electrode located at one end of said switching electrode has a laminated structure of a T-shaped auxiliary electrode having the convex portions at both the ends thereof and a U-shaped auxiliary electrode having the convex portion at the center thereof.

9. The liquid crystal display element according to claim 8, wherein said auxiliary electrode located at the other end of said switching electrode has a laminated structure of a rod-like auxiliary electrode and a concave auxiliary electrode having the concave portion at the center thereof, said rod-like auxiliary electrode and said concave auxiliary electrode corresponding to said T-shaped auxiliary electrode and said U-shaped auxiliary electrode, respectively.

10. The liquid crystal display element according to claim 2, wherein said switching electrode comprises a plurality of comb-shaped switching electrodes, and teeth of said comb-shaped electrodes run substantially parallel to one another, thereby constituting said opposing electrodes of said switching electrode.

11. The liquid crystal display element according to claim 10, wherein said liquid crystal layer has two domains for compensating for the gradation inversion between said opposing electrodes of said switching electrode when said liquid crystal display element is driven.

12. The liquid crystal display element according to claim 11, wherein said two domains for compensating for the gradation inversion are symmetrically oriented about the center line between said opposing electrodes of said switching electrode.

13. The liquid crystal display element according to claim 12, wherein said auxiliary electrode comprises a plurality of electrodes laminated through an insulating film.

14. The liquid crystal display element according to claim 13, wherein said auxiliary electrode located at one end of said switching electrode has a laminated structure of a plurality of concave and convex auxiliary electrodes, each having at least one concave portion, and convex portions of said plurality of concave and convex auxiliary electrodes alternately protrude in the direction of lamination.

15. The liquid crystal display element according to claim 14, wherein said auxiliary electrode located at one end of said switching electrode has a laminated structure of a T-shaped auxiliary electrode having the convex portions at both the ends thereof and a U-shaped auxiliary electrode having the convex portion at the center thereof.

16. The liquid crystal display element according to claim 15, wherein said auxiliary electrode located at the other end of said switching electrode has a laminated structure of a rod-like auxiliary electrode and a concave auxiliary electrode having the concave portion at the center thereof, said rod-like auxiliary electrode and said concave auxiliary electrode corresponding to said T-shaped auxiliary electrode and said U-shaped auxiliary electrode, respectively.

17. The liquid crystal display element according to claim 10, wherein said comb-shaped switching electrodes and said auxiliary electrodes are continuously formed, thereby constituting a uniform electrode.

18. A method of manufacturing a liquid crystal display element comprising a first substrate, a second substrate paired with said first substrate, a liquid crystal layer containing liquid crystal molecules interposed between said first substrate and said second substrate, and a switching electrode having at least one pair of opposing electrodes formed on a main surface of said first substrate and having auxiliary electrodes at both the ends of said switching electrode forming with stability a boundary surface at both the ends of said switching electrode, said main surface facing said second substrate, said method comprising the steps of:

forming an orientation film on each of the facing main surfaces of said first and second substrates;

rubbing the facing main surfaces of said orientation films in a longitudinal direction of said switching electrode;

interposing said liquid crystal layer between said first substrate and said second substrate; and orienting said liquid crystal molecules substantially parallel to the longitudinal direction of said switching electrode, and orienting said liquid crystal molecules so that said liquid molecules are inclined with respect to said main surface of said first substrate, and wherein said liquid crystal layer has two domains for compensating for the gradation inversion between said opposing electrodes of said switching electrode when said liquid crystal display element is driven and said boundary surface is situated between said two domains.

19. The method of manufacturing a liquid crystal display element according to claim 18, wherein an angle of inclination of said liquid crystal layer relative to said first substrate is 1° to 30°.

20. A method of switching a liquid crystal display element comprising a first substrate, a second substrate paired with said first substrate, a liquid crystal layer interposed between said first substrate and said second substrate, and a switching electrode having at least one pair of opposing electrodes formed on a main surface of said first substrate and having auxiliary electrodes at both the ends of said switching electrode forming with stability a boundary surface at both the ends of said switching electrode, said main surface facing said second substrate, said method comprising the step of:

changing an orientation of said liquid crystal molecules by interfacial energy generated between two domains which are formed between said switching electrode and said opposing electrode and are symmetrically polarized about said boundary surface at the center line between said switching electrode and said opposing electrode, said two domains compensating for the gradation inversion.

* * * * *